3,290,139
PROCESS FOR SLOW RELEASE FERTILIZER COMPRISING UREA, PARAFFIN WAX, AND UREA-WAX ADDUCT INHIBITOR
Robert H. Campbell, Brookhaven, Pa., and Ivor W. Mills, Claymont, Del., assignors to Sun Oil Company, Philadelphia, Pa., a corporation of New Jersey
No Drawing. Filed Sept. 11, 1963, Ser. No. 308,061
7 Claims. (Cl. 71—30)

This application is a continuation-in-part of application Serial No. 240,141, filed November 26, 1962, by Robert H. Campbell and Ivor W. Mills and now abandoned.

This invention relates in one aspect to a method of forming a stable dispersion of urea in molten paraffin wax. The dispersion is stable in that the urea does not react with the molten paraffin wax to form an adduct. This reaction is prevented, and stability thus imparted to the dispersion, by incorporating into the paraffin wax a small amount of certain types of nitrogen compounds. Suitable nitrogen compounds are fatty amines, fatty amides, fatty nitriles, fatty substituted heterocyclic nitrogen compounds, and alkanol amines. The stable dispersion is useful in that a slow release urea fertilizer can be made therefrom.

Nitrogen, potassium, and phosphorus are essential elements for plant growth and commercially available fertilizers invariably contain one or more of these elements. Examples of those in frequent use at the present time include urea, ammonium nitrate, ammonium sulfate, potassium chloride, sodium nitrate, potassium sulfate, monoammonium phosphate, diammonium phosphate, calcium cyanamide, potassium nitrate, potassium phosphate, superphosphate (a mixture of calcium acid phosphate and calcium sulfate), and triple superphosphate (calcium acid phosphate). Urea is a preferred source of nitrogen because it contains a higher percentage of nitrogen than most of the other nitrogen fertilizer compounds presently in use. Most commercially available fertilizers are either a nitrogen fertilizer, i.e., they contain only a source of nitrogen, or are complete fertilizers in which case they contain a source of all three essential elements, i.e., nitrogen, phosphorus, and potassium.

Unfortunately, most of the commercial fertilizers mentioned previously are readily water soluble and this creates a number of disadvantages. In a heavy rainfall much of the fertilizer may be dissolved in the rainwater and soaked into the ground below the plant roots or rapidly transported away by flowing surface water. This fertilizer never becomes available to the plants. Another disadvantage is that the fertilizer often becomes available to the plant too rapidly resulting in injury to the plant rather than benefit. This is often noticed in "burned" lawns, crops, etc.

One method of reducing the rate at which the fertilizer is consumed is to mix the fertilizer, which can be a single compound as in the case of a nitrogen fertilizer or a blend of several compounds as in the case of a complete fertilizer, and molten wax, i.e., disperse the fertilizer in molten wax, form the dispersion into small particles in a mold and allow the particles to cool below the melting point of the wax. The resulting particles are a dispersion of solid fertilizer particles in solid wax. Each particle of fertilizer is substantially completely surrounded by and encased in wax. They can also be described as a slow release fertilizer because the water resistance of the dispersed fertilizer is higher than the water resistance of the fertilizer compound alone. A quantitative determination of water resistance, i.e., release rate, can be made by submerging a known amount of the slow release fertilizer in water at room temperature (i.e., 25° C.) and without agitation and thereafter determining at various time intervals the amount of fertilizer ingredient which has dissolved in the water. The water resistance of the fertilizer can be varied, by varying the amount of wax in the dispersion, so as to provide the proper rate of release of the fertilizer for the particular climatic conditions encountered. In areas of relatively heavy rainfall the water resistance of the fertilizer should normally be relatively high and the amount of wax in the dispersion should be relatively high. Conversely, in relatively dry areas the water resistance should be relatively low and the amount of wax in the dispersion should be relatively low.

Although any kind of wax can be used to form a slow release fertilizer, paraffin wax and microcrystalline wax are preferred because they are generally less costly than other waxes such as ozocerite wax, etc. In addition, paraffin wax is often less expensive than microcrystalline wax hence between these two, the former is preferred.

It has already been mentioned that urea is a preferred source of nitrogen. However, in preparing a slow release urea-paraffin wax fertilizer a difficulty is encountered. When urea and molten paraffin wax are initially mixed, nothing unusual occurs. Shortly after mixing, however, a white precipitate forms. If the ratio of urea to paraffin wax is higher than about 1:1 the entire mass becomes a solid having about the texture of wet sand. In this case it is extremely difficult to even remove the solid mass from the mixing vessel. The precipitate is not merely a physical mixture of wax and urea because when the precipitate is separated and heated to 210° F. the wax component thereof, which has a melting point of 129° F., does not melt. Analysis of the precipitate indicates that it is a urea-paraffin wax adduct having a composition of about 76% urea-24% paraffin wax. The time required for adduction, i.e., the formation of the precipitate, varies somewhat but appears to depend mainly upon urea particle size. When commercial crystal urea, which has a particle size of mainly larger than 100 mesh (all mesh sizes are by U.S. Standard Sieves) is used adduction often occurs in less than 15 minutes. When urea having a particle size of 100% through 200 mesh is used adduction often occurs in less than 5 minutes. In any event the reaction often occurs before the dispersion of urea in paraffin wax can be shaped into small particles.

The solid adduct itself has some slow release properties and has been disclosed and claimed in a copending application Serial No. 308,087, filed concurrently herewith, in which application it is disclosed that the water resistance of a urea-paraffin wax adduct is higher than the water resistance of a dispersion of urea in paraffin wax containing the same total amounts of urea and paraffin wax but in which the urea is in the unadducted form. Unfortunately, it has been found that the water resistance of the urea-paraffin wax adduct composition sometimes decreases rapidly after prolonged contact of the composition with water. This behavior is unpredictable since some batches of adduct exhibit it while other, apparently identical, batches do not. Because of this erratic behavior it is often desirable that the slow release fertilizer be a dispersion of urea in wax rather than a urea-paraffin wax adduct. Where such is the case a method of preventing or at least postponing the adduction reaction is necessary in order that such reaction does not occur during the time the dispersion is being processed into small particles. We have now found such a method. More specifically we have found compounds which when incorporated into molten paraffin wax prevent or at least substantially delay adduction of urea when the latter is mixed therewith.

According to the invention adduction of the urea in a urea-molten paraffin wax mixture is prevented or at least substantially delayed by incorporating into the molten paraffin wax a small amount of certain types of nitrogen compounds. Suitable nitrogen compounds are fatty amines, fatty amides, fatty nitriles, alkanol amines, and fatty substituted heterocyclic nitrogen compounds. Of these the fatty amines, fatty amides, and trialkanolamines are preferred. These various types of suitable compounds are discussed individually as follows:

Fatty amines suitable for the present purpose have the general formula

<p style="text-align:center">R—N<     (Formula 1)</p> wherein R is a fatty acid radical, and the remaining valences of the nitrogen atom are satisfied by hydrogen or other radicals, either fatty acid radicals or non-fatty acid radicals. A fatty acid radical corresponds to the radical attached to the carboxylic acid group (COOH) of a fatty acid. For the present purpose R should contain 10–30, preferably 14–25, carbon atoms. In addition, R will contain only carbon, hydrogen, and oxygen. In most cases R will contain only carbon and hydrogen, corresponding to, for example, the fatty acid radical in stearic acid, but can also contain oxygen, corresponding to, for example, the fatty acid radical in hydroxystearic acid. R can be a saturated radical or can contain unsaturation, as in the case of the fatty acid radicals in stearic and oleic acids respectively. Furthermore, all of the carbon atoms in R will be in a straight chain, as is the case with all fatty acids.

In the above formula the remaining valences of the nitrogen atom can be hydrogen, in which case the fatty amine will be a primary fatty amine. It is not necessary, however, that they be satisfied by hydrogen for they can also be satisfied by other radicals in which case the amine will be a secondary or tertiary amine. For example, one or both can be satisfied by alkyl groups such as in

It is also not necessary that they be satisfied by radicals containing only carbon and hydrogen for such radicals can also contain other elements such as oxygen as in the case of N-hydroxyalkyl fatty amines or N,N-polyoxyalkyl fatty amines such as

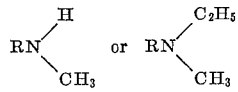

or other elements such as nitrogen as in the case of a diamine such as

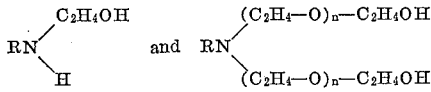

In addition it is not necessary that the radicals satisfying the remaining valences by aliphatic radicals for such fatty amines as

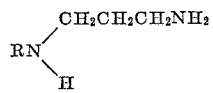

can also be used. If desired one or both of the remaining valences can, of course, be satisfied by radicals which are the same as R.

Certain fatty amines are preferred for the present purpose and of the preferred fatty amines some are more preferred than others. The preferred fatty amines are those in which the remaining valences of the nitrogen atom in Formula 1 are satisfied by radicals containing only carbon, hydrogen, nitrogen and oxygen. More preferably, the valences are satisfied by hydrogen.

The term fatty amine as used herein also includes acid salts of fatty amines. Such salts are obtained simply by mixing the fatty amine and an acid. For example,

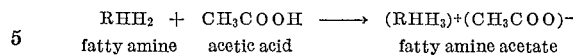

Fatty amines are articles of commerce and can be prepared by well known techniques. By way of example those having the formula $RNH_2$ can be prepared by the pyrolysis of a fatty acid amide followed by hydrogenation. Reaction of $RNH_2$ with methyl chloride yields $RNHCH_3$ or $RN(CH_3)_2$. Reaction of $RNH_2$ with an alkylene oxide such as ethylene oxide yields such fatty amines as $RNH(CH_2CH_2OH)$, $RN(CH_2CH_2OH)_2$, <p style="text-align:center">$RN(CH_2CH_2OCH_2CH_2OH)_2$</p> etc. These and other reactions are known.

Another group of compounds suitable for the present purpose is the fatty amides. They have the following formula:

 (Formula 2)

R is, with one exception, the same as the R in Formula 1. The only exception is that in Formula 2, R should contain 9–29, preferably 13–24, carbon atoms rather than 10–30, preferably 14–25, as specified in the discussion of Formula 1. The reason for this distinction is that Formula 2 contains a carbon atom which is not present in Formula 1. Consequently the total number of carbon atoms in the

portion of Formula 2 is 10–30, the same as in the R portion of Formula 1. In each case all the carbon atoms are in a straight chain.

The remaining valences of the nitrogen atom in Formula 2 can be satisfied in the same manner as described in conjunction with Formula 1. The preferred manner of satisfying the remaining valences is the same as the preferred manner in the case of the fatty amines.

The fatty amides and derivatives thereof can also be prepared by known methods. For example,

is prepared by high temperature ammoniation of the corresponding fatty acid, i.e., a fatty acid having the formula RCOOH.

Another group of compounds suitable for the present purpose are the fatty nitriles. These compounds have the following formula <p style="text-align:center">RC≡N     (Formula 3)</p> wherein R is as described for the fatty amines and fatty amides except that the total number of carbon atoms in the fatty nitriles, including the carbon atom in the characteristic —C≡N radical, should be 10–30, preferably 14–25.

The fatty nitriles are also obtainable by known techniques. The usual method of preparation is by pyrolysis of fatty amides.

Another group of compounds suitable for the present purpose are fatty substituted heterocyclic nitrogen compounds. These compounds are characterized by a heterocyclic nitrogen ring, i.e., a ring containing both carbon and nitrogen as ring members and only carbon and nitrogen as ring members, to a nuclear atom of which is attached a fatty acid radical containing 10–30 carbon atoms. In most cases, and preferably, the ring will be a 5 or 6 membered ring. The ring can contain unsaturation, but this is not necessary, and the ring can if desired be condensed with another ring. The number of nuclear nitrogen atoms in the ring can be one or more than one. As described, the fatty acid radical containing 10–30 carbon atoms can be attached to either a nuclear carbon atom or a nuclear nitrogen atom. Examples of suitable fatty substituted heterocyclic nitrogen compounds are as follows:

(a) 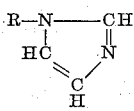

(b) 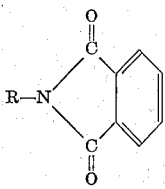

(c) 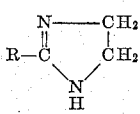

(d) 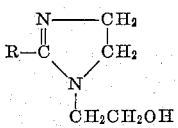

The preferred fatty substituted heterocyclic nitrogen compounds are fatty imidazolines, examples of which are (c) and (d) above. These compounds have the characteristic ring

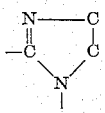

with the R radical positioned as indicated in (c) and (d) above. Preferably the fatty imidazoline contains only carbon, hydrogen, oxygen and nitrogen. More preferably all substituents on the characteristic ring are hydrogen except, of course, for the R radical.

The term fatty substituted heterocyclic nitrogen compound also includes acid salts thereof. These salts are obtained by mixing the compound with an acid such as acetic acid, etc. For example, a fatty imidazoline reacts with acetic acid to form a fatty imidazoline acetate.

The final group of compounds suitable for the present purpose are the alkanol amines. These compounds, which can also be prepared by known methods, have the formula

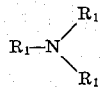

wherein $R_1$ in at least one instance is an alkanol group containing at least two carbon atoms and in the remaining instances is hydrogen. Examples of suitable alkanol amines are ethanolamine, triethanolamine, ethanolbutanolamine, diethanolpropanolamine, etc. Preferred alkanol amines are those in which $R_1$ is an alkanol group in all three instances, i.e., a trialkanolamine, and in which the alkanol groups each contain 2–4 carbon atoms, such as, for example, triethanolamine, tributanolamine, diethanolbutanolamine, etc.

As in the case of the fatty amines the term alkanol amine includes acid salts thereof. Such salts are prepared by merely mixing an acid such as hydrochloric acid or stearic acid with the alkanolamine. For example, triethanolamine stearate is prepared according to the following reaction.

$$RCOOH + (C_2H_4OH)_3N \rightarrow [HN(C_2H_4OH)_3]^+ [RCOO]^-$$

The dispersion of urea in molten paraffin wax can be formed by the method of the invention in any convenient manner. Preferably the paraffin wax is heated to about 225°–250° F. The additive of the invention, i.e., the fatty amine, fatty amide, fatty nitrile, fatty heterocyclic nitrogen compound, or alkanol amine, is then added to the wax and the mixture stirred until the additive dissolves in the wax. It is recognized that the additive may not "dissolve" in the wax in the technical sense of the word dissolve. The wax-additive mixture does, however, have the appearance of a solution in that it is a homogeneous, single phase mixture. Consequently the additive will be referred to as being dissolved in the wax. After dissolving the additive in the wax, the urea is then added and the resulting mass is stirred to insure that the urea is uniformly dispersed in the molten wax phase. The dispersion can then be shaped into fertilizer particles in any convenient manner such as by means of a pellet mold, etc. and then cooled.

Alternatively, the urea can be dispersed in the molten wax after which the additive is dissolved in the wax. This procedure has the disadvantage that the urea and molten wax may, and frequently do, react to form the adduct before the additive can be dissolved in the wax. The procedure described above obviates this problem and is therefore the preferred procedure.

The amount of additive used should be sufficient to stabilize the dispersion, i.e., should be sufficient to prevent adduction of the urea or at least postpone the adduction reaction for as long a time as it takes to form the dispersion into fertilizer particles. In most cases a dispersion stable for one hour will be satisfactory since this provides sufficient time for such processing of the dispersion. The amount of additive used to effect stability for at least one hour should be at least 0.1%, preferably at least 1%, by weight of the paraffin wax. Lower amounts can be used but the dispersion will be stable for a shorter period of time. Amounts as high as 20% by weight of the wax can be used but since it is usually desirable to keep the amount of non-fertilizer ingredients in the final composition as low as possible, the amount of additive is desirably not more than 10% by weight of the wax, preferably not more than 5%. Actually one advantage of the additives disclosed herein is that they are effective in small amounts. The amount of additive used in most cases will not be more than 3% by weight of the wax. A fatty acid such as stearic acid can be used to prevent adduction but the amount required is substantially greater than 3%. This is shown more clearly in the examples following.

The method of the invention is applicable to mixtures containing any amounts of urea and molten paraffin wax since any mixture of urea and molten paraffin wax will react to form an adduct at least to some extent. The amount of urea and molten paraffin wax influences the amount of adduct formed, since the adduct has a definite composition of about 76% urea-24% wax, rather than the fact of adduct formation. The relative amounts of urea and molten paraffin wax most frequently present in a mixture of same which is to be ultimately processed into fertilizer particles is discussed more fully hereafter.

The terms paraffin wax and microcrystalline wax are used herein in accordance with their conventional meanings. Both types of waxes are obtained only from petroleum, and since they are the only waxes obtainable from petroleum, they are referred to generically as petroleum wax. Their differences and similarities are well known to those skilled in the art and are summarized in Bennett, Commercial Waxes, Chemical Publishing Co. (1950), pp. 84–88. Both paraffin and microcrystalline waxes contain mainly saturated paraffin hydrocarbons, the former containing mainly straight chain paraffins while the latter contains a substantial amount of branch chain paraffins. Some typical properties of paraffin and microcrystalline waxes are shown in Table I below.

TABLE I

| Property | Paraffin Wax | Microcrystalline Wax |
|---|---|---|
| Molecular Weight | 250-500 | 500-800 |
| Melting Point, °F. (ASTM D-127) | 110-165 | 140-210 |
| Viscosity at 210° F. (ASTM D-446), S.U.S. | 30-50 | 60-100 |
| Penetration at 77° F. (ASTM D-1321, 100 g., 5 sec.), dmm | 5-25 | 5-25 |

It is apparent from the data in Table I that some of the physical properties of the paraffin waxes overlap the normal range of the same property in the microcrystalline waxes. The property which can be used, as is well known, to distinguish paraffin wax from microcrystalline wax is the type of crystals present in each. Paraffin wax has large well-formed crystals while microcrystalline wax contains small irregular crystals and no well-formed crystals of any size. Indeed, microcrystalline wax is sometimes referred to as amorphous. In the method aspect of the invention it is preferred that the paraffin wax have a melting point, viscosity, and penetration within the appropriate ranges specified in Table I. All wax properties specified elsewhere in this specification are determined by the appropriate test indicated in Table I.

It was mentioned previously that adduction of any mixture of solid urea and molten paraffin wax can be prevented by the method of the invention. As described, the relative amounts of urea and wax in such mixture is not critical, i.e., adduction will occur to some extent regardless of the amounts of urea and wax present.

In most cases, however, the amount of urea and wax will be within certain ranges depending upon whether the ultimate fertilizer is to be a nitrogen fertilizer or a complete fertilizer and depending upon soil and climatic conditions at the location of actual use. The use of a nitrogen fertilizer or a complete fertilizer depends mainly upon soil conditions. In some cases only nitrogen is needed hence only a nitrogen fertilizer is applied. A slow release nitrogen fertilizer containing urea as the source of nitrogen will normally contain, based on the total composition weight, a major amount of urea, usually 50-80%, more frequently 50-70%. The amount of wax phase, i.e., the total amount of wax and fatty amide, will normally be, based on the total composition weight, a minor amount, usually 15-49%, more frequently 25-49%.

In most cases soil conditions will dictate the use of a fertilizer containing a plurality of essential elements such as a complete fertilizer. In such a case the total amount of fertilizer ingredients and the amount of wax phase will still normally be a major amount and minor amount respectively, usually 50-80%, and 15-49% respectively, more frequently 50-70% and 25-49% respectively, but the actual amount of urea may be relatively small. For example, a 10-10-10 complete slow release fertilizer, i.e., a fertilizer containing 10% nitrogen as N, 10% phosphorus as $P_2O_5$, and 10% potassium as $K_2O$, might contain the following:

| | Percent |
|---|---|
| Urea | 21.4 |
| Triple superphosphate | 21.7 |
| Potassium chloride | 16.7 |
| Wax | 40.2 |
| | 100.0 |

A 5-15-10 (5% nitrogen, 15% phosphorus, and 10% potassium) complete slow release fertilizer might contain

| | Percent |
|---|---|
| Urea | 10.6 |
| Triple superphosphate | 32.6 |
| Potassium sulfate | 18.5 |
| Wax | 38.3 |
| | 100.0 |

In most cases the amount of urea in a complete slow release fertilizer will not be less than 5% nor more than 50% and will usually be at least 10%, more frequently at least 20%. Therefore, considering both the slow release complete fertilizer and the slow release nitrogen fertilizer, the amount of urea will usually be 5-80 parts urea and the amount of wax will be 15-49 parts. This also means that the method of the invention, i.e., the method of forming a stable dispersion of urea in molten paraffin, will usually be applicable to a dispersion of urea in molten paraffin wax containing 5-80 parts urea and 15-49 parts wax phase, more frequently 20-70 parts and 25-49 parts respectively.

The following examples illustrate more specifically the formation of a stable dispersion of urea in molten paraffin wax according to the method of the invention.

The procedure is substantially the same in each example. 40 parts of a paraffin wax having a melting point of 129° F., a penetration of 18 d.m.m. at 77° F. and 105 at 100° F., and a viscosity of 38.8 S.U.S. at 210° F. are heated to 225° F. Next 0.8 part of the specified additive (2% by weight of wax) is added to the wax with stirring. After the additive has dissolved in the wax 60 parts of urea are added. The mass is stirred and the time at which adduction occurs is noted. If adduction does not occur for 1 hour the experiment is ended. The examples below show the specific additives used and the adduction time obtained for each. The statement that adduction does not occur means that adduction had not occurred after one hour at which point the experiment was ended.

The only exceptions to the above procedure arise in Example I in which no additive is employed, and in certain other examples wherein the amount of additive is as stated therein.

*Example I*

No additive is used. Within 5 minutes the entire mass becomes solid. Analysis of the solid shows that it contains a substantial amount of a urea-paraffin wax adduct.

*Example II*

The additive is stearylamine, $C_{18}H_{37}NH_2$. Adduction does not occur.

*Example III*

The additive is oleylamine, $CH_3(CH_2)_7CH=CH(CH_2)_8NH_2$ or $C_{18}H_{35}NH_2$ Adduction does not occur.

*Example IV*

The additive is

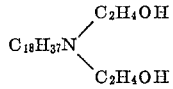

Adduction does not occur.

*Example V*

The additive is

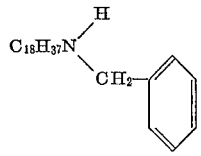

Adduction does not occur.

Example VI

The additive is

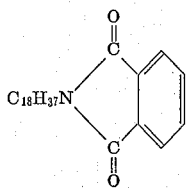

Adduction does not occur.

Example VII

The additive is

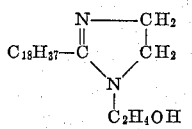

Adduction does not occur.

Example VIII

The additive is $C_{18}H_{37}-NH-CH_2CH_2CH_2NH_2$. Adduction does not occur.

Example IX

The additive is stearamide,

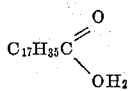

Adduction does not occur.

Example X

The additive is oleamide,

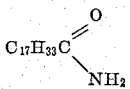

Adduction does not occur.

Example XI

The additive is Fatty Amide II,

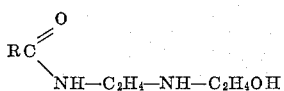

wherein R is as previously described. The amount of additive is 1% by weight of the wax. Adduction does not occur.

Example XII

The additive is Fatty Amide I,

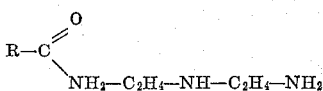

wherein R is as previously described. The amount of additive is 1% by weight of the wax. Adduction does not occur.

Example XIII

The additive is

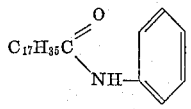

Adduction does not occur.

Example XIV

The additive is

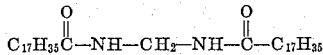

Adduction does not occur.

Example XV

The additive is

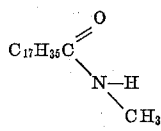

Adduction does not occur.

Example XVI

The additive is

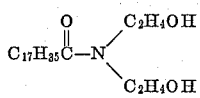

Adduction does not occur.

Example XVII

The additive is stearonitrile, $C_{17}H_{35}C\equiv N$. Adduction does not occur.

Example XVIII

The additive is oleonitrile, $C_{17}H_{33}C\equiv N$. Adduction does not occur.

Example XIX

The additive is triethanolamine. Adduction does not occur.

Example XX

The additive is triethanolamine stearate. Adduction does not occur.

Example XXI

The additive is stearic acid. The amount used is 2% by weight of the wax. Adduction occurs within 5 minutes.

Example XXII

The additive is stearic acid. The amount used is 5% by weight of the wax. Adduction occurs within 5 minutes.

Example XXIII

The additive used is stearic acid. The amount used is 24% by weight of the wax. Adduction does not occur.

From the foregoing description of the invention it will be evident that the term urea is not intended to include, and is hereby defined to exclude, a urea-paraffin wax adduct.

The invention claimed is:

1. Method of forming a slow release fertilizer comprising a dispersion of solid urea in a solid paraffin wax which when in molten state normally reacts with solid urea to form an adduct which comprises (1) heating said paraffin wax to above its melting point whereby molten paraffin wax normally susceptible to adduction is obtained, (2) dissolving in the resulting molten paraffin wax an adduct inhibitor selected from the group consisting of (a) fatty amines characterized by the presence of an RN group wherein R contains 10–30 carbon atoms in a straight chain, (b) fatty amides characterized by the presence of an RCON group wherein R contains 9–29 carbon atoms in a straight chain, (c) fatty nitriles having the formula RCN wherein R contains 9–29 carbon atoms in a straight chain, (d) alkanol amines containing at least 2 carbon atoms per alkanol group, and (e) fatty substituted heterocyclic nitrogen compounds characterized by the presence of an R substituted heterocyclic nitrogen ring wherein R contains 10–30 carbon atoms in a straight chain, the amount of said adduct inhibitor being at least 0.1% by weight of said molten paraffin wax, (3) dispersing solid urea in the molten paraffin wax containing said adduct inhibitor, and (4) cooling the resulting dispersion to below the melting point of the wax whereby a slow release fertilizer comprising a dispersion of solid urea in solid paraffin wax is obtained.

2. Method according to claim 1 wherein the amount of urea is 5–80 parts, the total amount of molten paraffin wax and said compound is 15–49 parts, and the amount of said compound is 0.1–20.0% by weight of said molten paraffin wax.

3. Method according to claim 2 wherein said compound is a fatty amine.

4. Method according to claim 2 wherein said compound is a fatty amide.

5. Method according to claim 2 wherein the amount of said compound is 1–10% by weight of said molten paraffin wax.

6. In a process in which solid urea is dispersed in a molten paraffin wax which normally reacts with said solid urea to form an adduct and the resulting mixture is subsequently cooled to below the melting point of said wax whereby a solid slow release fertilizer is obtained the improvement for inhibiting reaction between said solid urea and said molten paraffin wax to form an adduct which comprises dissolving in said molten paraffin wax a compound selected from the group consisting of (a) fatty amines characterized by the presence of an RN group wherein R contains 10–30 carbon atoms in a straight chain, (b) fatty amides characterized by the presence of an RCON group wherein R contains 9–29 carbon atoms in a straight chain, (c) fatty nitriles having the formula RCN wherein R contains 9–29 carbon atoms in a straight chain, (d) alkanol amines containing at least 2 carbon atoms per alkanol group, and (e) fatty substituted heterocyclic nitrogen compounds characterized by the presence of an R substituted heterocyclic nitrogen ring wherein R contains 10–30 carbon atoms in a straight chain, the amount of said compound being at least 0.1% by weight of said wax.

7. A process according to claim 6 wherein the amount of said compound is at least 3%.

References Cited by the Examiner

UNITED STATES PATENTS

| | | | |
|---|---|---|---|
| 2,559,398 | 7/1951 | Capell | 71—64 |
| 2,702,747 | 2/1955 | Studebaker | 71—64 |
| 2,936,226 | 5/1960 | Kaufman et al. | 71—64 |
| 3,014,783 | 12/1961 | Young | 71—64 |
| 3,034,858 | 5/1962 | Vives | 71—64 |
| 3,069,370 | 12/1962 | Jensen et al. | 71—64 |
| 3,096,171 | 7/1963 | Woerther | 71—64 |
| 3,112,343 | 11/1963 | Allgeuer et al. | 71—28 |

FOREIGN PATENTS

| | | |
|---|---|---|
| 245,105 | 5/1963 | Australia. |
| 648,545 | 9/1962 | Canada. |
| 876,675 | 9/1961 | Great Britain. |
| 908,642 | 10/1962 | Great Britain. |

OTHER REFERENCES

Hagan, Sister M., Clathrate Inclusion Compounds, Reinhold Pub. Corp., N.Y. (1962), pp. 10–15.

DONALL H. SYLVESTER, *Primary Examiner.*

ANTHONY SCIAMANNA, *Examiner.*

T. D. KILEY, *Assistant Examiner.*